June 17, 1969 F. E. HACKER 3,450,447
ANTIFRICTION BEARING ASSEMBLY
Filed March 1, 1967
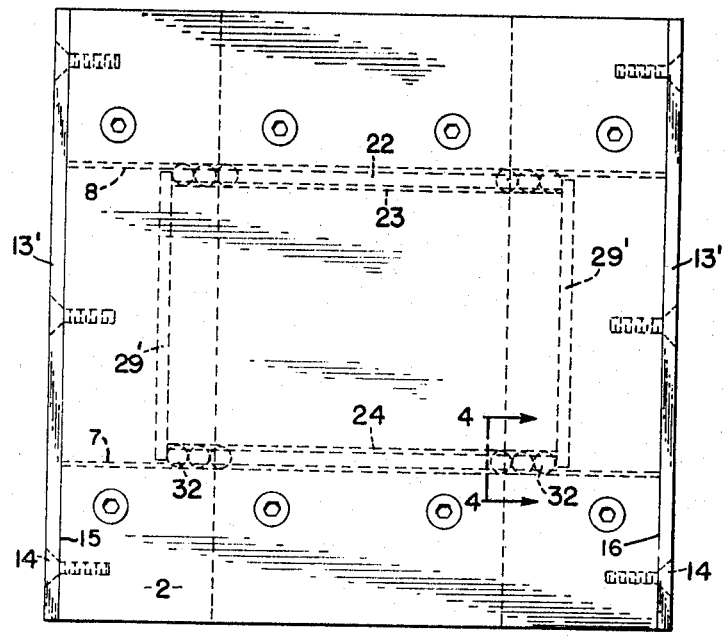
FIG. 1
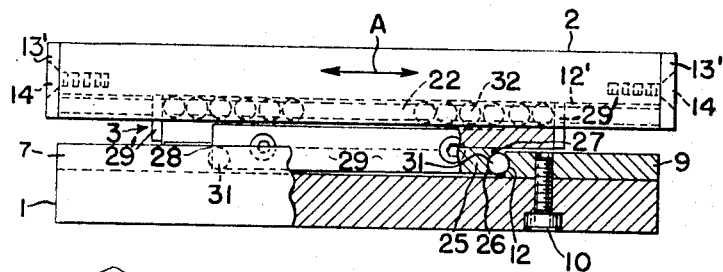
FIG. 2
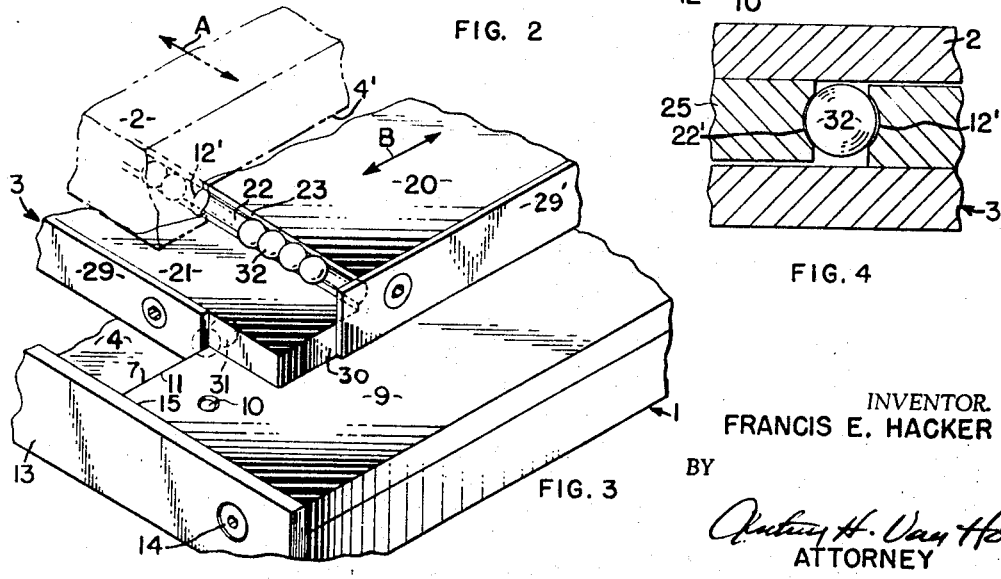
FIG. 3
FIG. 4
INVENTOR.
FRANCIS E. HACKER
BY
ATTORNEY

INVENTOR.
FRANCIS E. HACKER

United States Patent Office 3,450,447
Patented June 17, 1969

3,450,447
ANTIFRICTION BEARING ASSEMBLY
Francis E. Hacker, 367 N. Market St.,
Galion, Ohio 44833
Filed Mar. 1, 1967, Ser. No. 619,852
Int. Cl. F16c 29/04
U.S. Cl. 308—6          1 Claim

ABSTRACT OF THE DISCLOSURE

The disclosure is directed to a bearing assembly adapted to be supported preferably on a substantially plane surface and, in turn, to receive an object to be supported on a portion of the assembly for free movement with said portion in a plurality of directions in a single plane, and without lost motion in movement or change of direction of such movement.

BRIEF SUMMARY OF INVENTION

The bearing arrangement embodying the present invention is such that there is provided a base on which an intermediate plate-like bearing member, and an outer tool or other object supporting member are mounted in superposed fashion for substantial friction-free relative sliding or rotary movement in a plurality of directions and in which means is provided to releasably retain the superposed members in assembled position.

An object of the invention therefore is to construct a bearing arangement of the type which is characterized by extreme simplicity and compactness of construction, effective and substantially friction-free relative movement of the superposed members and free from accidental disassembly.

Another object is a bearing arrangement of the type disclosed in which antifriction ball or roller bearings are interposed between the several superposed members in grooves or races, some of which are disposed in angular relation to others of the grooves.

A further object is to eliminate the necessity for employing ball or roller cages or spacing means between adjacent balls or rollers, and to provide removable means for preventing accidental loss or displacement of such bearing elements from the races or grooves in which they operate, yet to permit removal of the bearing elements from the grooves for cleaning or replacement of damaged ones, when desired.

Other and further objects and advantages of this invention will become more apparent from the folowing description and claims, reference being made to the accompanying drawing which shows an embodiment of the present invention and the principles thereof, and in which drawing like reference characters are employed to designate like parts throuhgout the same.

THE DRAWINGS

FIGURE 1 is a top plan view of a bearing arrangement embodying the invention;

FIGURE 2 is a side view thereof, partly broken away;

FIGURE 3 is an enlarged fragmentary view of the bearing arrangement;

FIGURE 4 is an enlarged section taken on line 4—4 of FIGURE 1; and

DESCRIPTION

Figure 5:
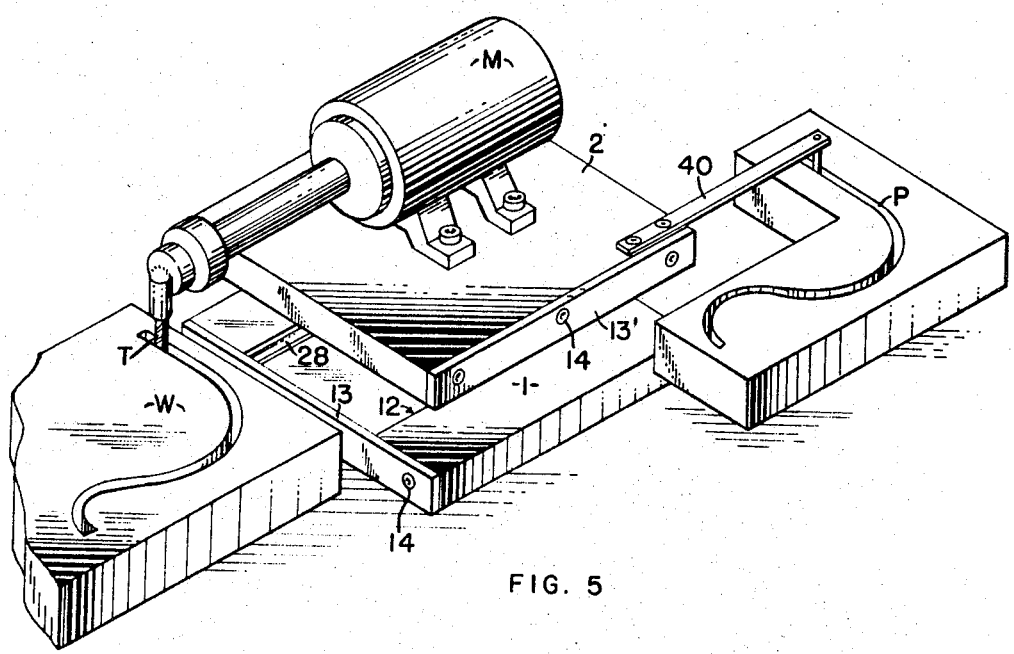
FIGURE 5 is a perspective view of an embodiment of the invention shown in use as a support for a tracer or duplcating power driven tool whereby a design may be accurately marked or cut and reproduced in a workpiece from a model.

In carrying out the invention, reference is made to the following description of an embodiment thereof wherein there is provided a lower or base plate-like element 1, an upper article or tool supporting plate-like element 2, and an intermediate plate-like bearing member 3, all arranged in superposed spaced substantially antifriction bearing relation in the order mentioned whereby free relative rotary or sliding movement of the elements in any direction may be carried out.

More particularly, the lower or base element 1 comprises rectangular flat plate, the upper portion of which is recessed at 4 between opposite sides 5 and 6, the recess opening at its ends along the sides 7 and 8 of the plate.

Strips 9 may be removably secured in the recess as at 10, their top surfaces being flush with the adjacent top surfaces of the plate 1, and the facing longitudinal walls 11 of the strips are grooved to provide parallel ball races 12. While I prefer to employ strips 9, they may be eliminated and the recess 4 milled directly in the plate 1, the inner side walls of the recess in such case being formed with ball races such as 12.

Since the races extend to the opposite ends of the recess, end plate 13 are removably secured at 14 to the end walls or sides 15 and 16 of the base 1 and overlie the recess open ends and the open ends of the races, for purposes to be set forth hereinafter.

The top element 2 is constructed in like manner to that of the bottom or base plate, as just described, but in superposed position over the bottom plate and the intermediate bearing member 3. The recess 4' is disposed in a direction normal to that of the bottom plate. The top plate is likewise provided with ball races 12' along opposite sides of the recess 4', and with removable end plates 13' overlying the open ends of the recess 4' and the races 12'.

The intermediate bearing member 3 comprises a plate-like body as clearly shown in FIGURES 2 and 3 of rectangular form and having an upper raised portion 20 recessed at 21 inwardly from one pair of opposite sides of the body and extending laterally in a direction normal to that of the recess 4. Ball races 22 are provided in the opposite side walls 23 and 24 of the raised portion and are coextensive therewith. The depending portion 25 of the member 3 is aso provided with ball races 26 along opposed side walls 27 and 28 and these races are oriented 90° to the races 22.

End pates 29 are removably secured to opposed side walls of the member 3 and overlie the open ended races 12, while end plates 29' are removably secured to the remaining opposed side walls of the member 3 which overlie the open ends of the races 22 and span the races 12'.

As shown, the complementary races 12 along opposite sides of the recess 4 of the base member and the races 26 of the depending portion 25 of the intermediate member 3 contain a series of ball bearings 31 extending laterally and parallel in one direction to the bearing arrangement while the complementary races 12' along opposite sides of the upper member 2 and the races 22 of the intermediate member 3 contain a series of ball bearings 32 extending laterally and parallel to each other in a direction normal to the series 31.

The end plates 13, 13', 29 and 29', overlie the respective open ends of the ball races 26 and 22 and when in place prevent accidental loss or displacement of the ball bearings from the races, although these end plates may be removed in disassembling the bearing arrangement for cleaning or replacement of balls. Disassembly of the bearing arrangement is easily accomplished by removing the screws 14 in the members 1 and 2 to remove the end plates 13 and 13', respectively, whereupon the members 1, 2 and 3 may be separated.

Consequently, as indicated in the drawing, movement of the upper member 2 relative to the base member may be as indicated by the arrow A, while the movement of the intermediate member 3 may be in the direction of the arrow B. By virtue of the novel bearing assembly disclosed herein, the relative movements of the elements is not limited to linear directions, but resultant nonlinear movements in any direction are readily obtainable as a result of the invention.

This is illustrated in FIGURE 5 which shows the bearing arrangement applied in use for reproducing a pattern in a workpiece from an original model, wherein a power tool, such as an electric motor may be mounted on the upper element 2 for driving a cutting tool T. A tracer 40 is also mounted on the plate 2 for engagement with a pattern P to be reproduced in or on the workpiece W.

The end plates 29 project into the channel 4 sufficienly to abut the end plates 13 to limit movement of the intermediate bearing member 3 in the directions of the arrow B, while the opposed free sides 30 of the member in movement in the direction of arrow A limit such movement in either direction by abutting one or the other of the end plate 13' on member 2.

The foregoing description and accompanying drawing are considered as illustrative only of the principles of the invention and the antifriction bearing assembly of the present invention is not to be regarded as limited by the above described embodiments. Alternative arrangements of parts, substitution of materials and other organization and assembly procedures, apparent to those skilled in the art, may be employed without departing from the scope and spirit of the invention as claimed.

I claim:

1. A load supporting bearing assembly comprising supperposed base, intermediate and upper load supporting plate members all arranged for relative movement in horizontal parallel planes, said base plate being recessed inwardly of its top surface across said plate, said intermediate plate overlying each side of said recess and having a portion depending into said recess for movement therealong, complementary ball races formed along opposite sides of the depending portion and opposed adjacent walls of said recess, a series of ball bearings in the races extending throughout the complementary races in the intermediate plate, and removable end closures for the complementary races in the intermediate and upper mediate plates, said intermediate plate having a raised body portion extending in a direction normal to the recess in the base plate, ball races formed along opposite sides of the raised portion thereof, ball races formed in said upper plate along its opposite sides normal to said base plate recess and complementary to said upper plate races, series of ball bearings in the complementary races of the upper and intermediate plates and extending throughout the complementary races formed in the raised portion of the intermediate plate, and removable end closures for the complementary races in the intermediate and upper plates, and removable end closures overlying the ends of the recess and the races in the base plate and the ends of the races in the upper plate and said end closures of the base plate and the upper plate determining the limit of relative travel of the respective plates by engagement with the end closure carried by the intermediate plate, said races in the base and upper plates being of greater length than that of their complementary races to provide relative movement of the upper, intermediate and base plates in directions translatable into linear and nonlinear forms.

References Cited

UNITED STATES PATENTS

| | | | |
|---|---|---|---|
| 1,898,273 | 2/1933 | Stevens | 308—6 |
| 2,063,741 | 12/1936 | Hibbard | 308—6 X |
| 2,303,299 | 11/1942 | Finn | 308—6 X |
| 2,518,102 | 8/1950 | Ward | 308—6 X |
| 2,520,453 | 8/1950 | Burmist | 308—6 |
| 3,244,392 | 5/1966 | Wallerstein. | |
| 3,245,512 | 5/1966 | Heyer. | |
| 3,353,875 | 7/1964 | Karge | 308—6 |

FOREIGN PATENTS 860,166 2/1961 Great Britain.

MARTIN P. SCHWADRON, *Primary Examiner.*

L. L. JOHNSON, *Assistant Examiner.*

U.S Cl. X.R.

90—13.2